Aug. 16, 1932.  J. A. OLSON  1,871,463
CHUCK OPERATING DEVICE
Filed Nov. 19, 1928
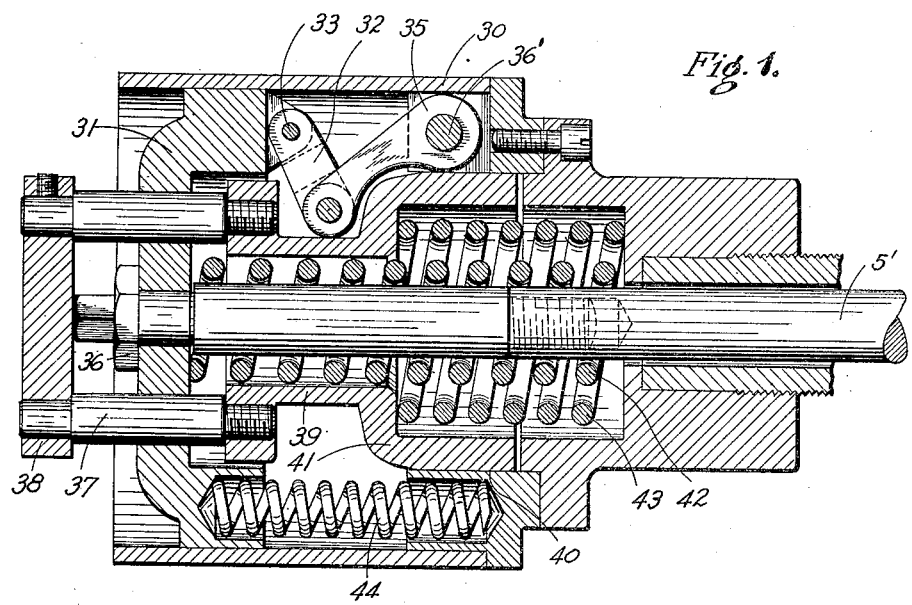
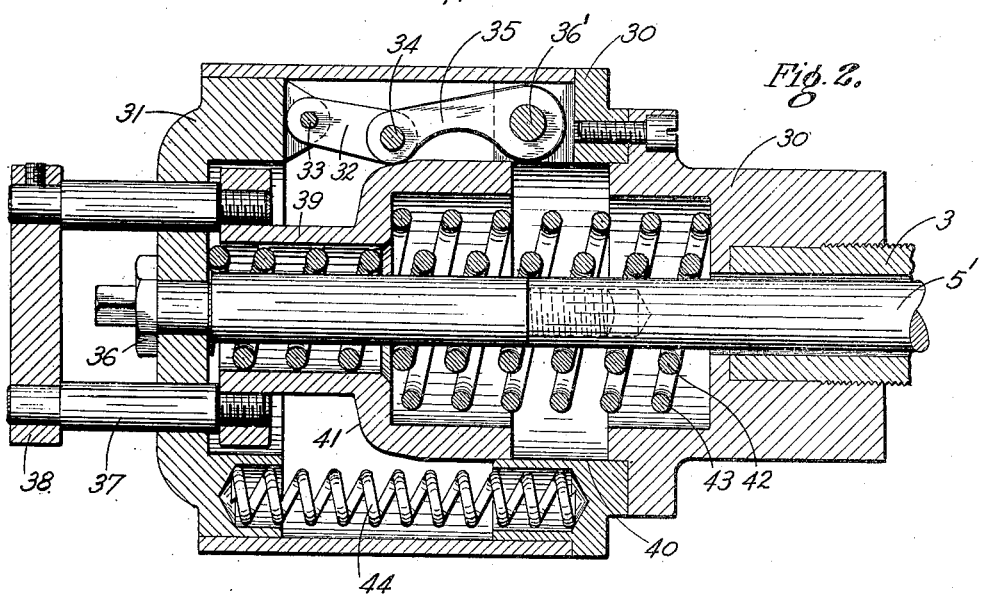
INVENTOR
JOHN A. OLSON
BY Richey & Watts
ATTORNEY Patented Aug. 16, 1932

1,871,463

UNITED STATES PATENT OFFICE

JOHN A. OLSON, OF CLEVELAND, OHIO

CHUCK OPERATING DEVICE

Application filed November 19, 1928. Serial No. 320,398.

This invention relates to mechanism for operating rods and the like which are to be moved axially and more particularly relates to mechanism for actuating draw rods of chucks including chucks of the bell crank operated type.

Heretofore it has been common practice to actuate draw rods or similar elements of chucks by means of air cylinders. These devices have certain inherent disadvantages such as, for example, that it is necessary to provide a supply of air under pressure for operating the chucks which at the outset entails expense and in operation requires more or less constant attention and maintenance expense. Moreover, provision must be made for mechanically maintaining the jaws of the chuck in gripping position during the machining operation or if reliance is placed alone in the air supply to do this work the success of the operation depends on whether or not the air supply is sufficient and is properly maintained.

In mechanically operated draw rod chucks heretofore proposed and with which I am familiar, it has never been possible to move the draw rods more than a short distance, such as about 1/4 inch. When that travel is reduced by the bell cranks which have a ratio of perhaps 3 to 1 this draw rod travel gives a very little jaw travel. Moreover, such chucks are not readily adjustable to accommodate various ranges of work piece sizes.

By my invention I am able to overcome the disadvantages of both of these types of chucks and to construct a mechanically operated chuck which is positively acting, and which has not only the ability to accommodate a much wider range of work piece sizes than has heretofore been possible, so far as I am aware, but also will adapt itself to the firm clamping of work pieces having a small range of sizes without any mechanical adjustment of the chuck for such ranges.

For the purpose of illustrating my invention I have chosen to show and describe in this application two modifications of structure embodying my invention in which Figure 1 is a longitudinal cross sectional view illustrating a mechanism embodying the principles of my invention.

Figure 2 is a view similar to Figure 1 showing the parts in different positions.

Figures 1 and 2 show at 5' one end of a draw rod adaptably connected at its other end to a chuck of the bell crank operated type (not shown). The end of draw rod 5' extends into a housing 30 secured to tube 3 and is attached by a shoulder and nut connection as at 36 to a member 31 disposed with sliding contact with the annular inner wall thereof. This member 31 pivotally carries a plurality of toggle links 32 which are pivoted thereto as at 33 and which are in turn pivoted as at 34 to other toggle links 35 which links are in turn pivoted as at 36' to the housing 30. The member 31 is perforated to receive slidable pins 37 of an operating lever 38, the pins being connected within the member 31 to a lost motion member 39 which has sliding engagement with an annular surface 40 of housing 30 and which also has a cam surface 41 to engage with the toggle links 32 and 35 in certain positions. About the draw rod 5' and compressed against and between members 31 and 30, is a coil spring 42 and a second coil spring 43 surrounds spring 42 and is compressively seated on members 30 and 39.

Coil springs 44 seat compressively in suitable sockets in members 31 and 30 and are disposed in alternate arrangement with respect to links 32 and 35.

In Fig. 1 the parts are shown in jaw releasing position which may be maintained by application of pressure to handle 38 until a work piece is properly located between the jaw clamps of the chuck. When it is desired to clamp the work piece in the chuck the lever 38 is moved to the left as in Figure 1 and carries with it the lost motion member 39 until the cam surfaces 41 engage the toggle links and straighten the latter, which straightening is accompanied by axial movement of member 31 and the movement therewith of draw rod 5'. When the parts have reached the jaw clamping position substantially as shown in Figure 2, the parts 41 and 5' are maintained in the jaw clamping position by the compressive force exerted by the springs 42, 43 and 44 and by the locking engagement by the cam surface 41 with the toggle links. The work may be released from the chuck by pushing the handle to the right, as viewed in Fig. 1, so as to move it from the position shown in Fig. 2 to that shown in Fig. 1. The draw rod is also moved to the right which opens the jaws of the chuck (not shown) so that the work may be removed.

It will be noted that the housing 30 serves as an abutment for the mechanism which actuates the draw rod.

It will be noted that the draw rod 5' is of fixed length throughout the operation of the mechanism of this invention although it may be initially adjusted in length. By virtue of the lost motion connection between the member 41 and the cap 31 the member 41 is movable with the draw rod 5' and relative to it. It is this lost motion connection which permits the use of a draw rod of fixed length, with a wide range of length of movement of the draw rod and at the same time insures positive locking of the jaw clamp regardless of length of travel of the draw rod, this latter function being made possible by suitably shaping the cam surface of member 41 and adjusting its position relative to the links.

Having thus described my invention in such detail that it will be readily understood by those skilled in the art I desire that it be understood that my invention is not limited to the foregoing details of construction and operation but on the contrary that it is limited to the scope of the appended claims.

I claim:—

1. In a chuck draw rod operating device, a housing supported by the chuck drive tube, a head secured to the draw rod and reciprocable within said housing means to reciprocate said head including a plurality of toggle links pinned to the head and housing, means to actuate the toggle links including a cam reciprocally disposed about the draw rod, spring means to actuate the head and draw rod in one direction.

2. In a chuck draw rod operating device, a housing supported by the chuck drive tube, a head secured to the draw rod and reciprocable within said housing, means to reciprocate said head including a plurality of toggle links pinned to the head and housing, means to actuate the toggle links including a cam reciprocally disposed about the draw rod, independent spring means for actuating said head and cam in one direction to move the draw rod.

3. In a lathe chuck draw rod actuating mechanism, a housing carried by and rotatable with the chuck drive tube, means supported within the housing for moving the draw rod axially relative thereto including a head carried by the draw rod and reciprocable in said housing, a plurality of toggle links pivotally secured to the head and housing, means to reciprocate the head in one direction comprising a spring interposed between the head and housing end wall about the draw rod and a cam disposed about the spring and draw rod and a second spring disposed about said first spring and the draw rod and bearing against the cam and housing end wall, said cam adapted to engage and actuate the toggle links to move the said head.

4. In a chuck draw rod operating mechanism, a housing supported by the drive tube, means disposed within the cylindrical housing for moving the draw rod axially including a head secured to the draw rod reciprocally disposed within and guided by said housing, a plurality of toggle links pivotally connected to the housing and pivotally connected to the head adjacent the periphery thereof, a plurality of springs interposed between the toggle links and abutting the head and housing, spring means disposed about the draw rod and abutting the housing and head, a cam disposed about said spring means and draw rod for actuating the toggle links and a second spring means disposed about the first spring means and draw rod abutting the cam and housing, means carried by the cam and extending through said head for actuating the said cam in either direction.

5. In a lathe chuck actuating mechanism, a housing, a drive tube, a draw rod connected to the chuck, said housing being supported by the drive tube, means supported by the housing for actuating the draw rod including a head secured to the draw rod, toggle links interposed between the head and housing, spring means for actuating the head in a longitudinal direction, to actuate the draw rod and expand the toggle links, cam means to further expand the toggle links and spring means to actuate the cam.

6. In a lathe chuck actuating mechanism, a housing, a drive tube, a draw rod connected to the chuck, said housing being supported by the drive tube, means supported by the housing for actuating the draw rod including a head secured to the draw rod, and an abutment extending beyond the head, toggle links interposed between the head and housing, spring means for actuating the head in a longitudinal direction, to actuate the draw rod and expand the toggle links, cam means to further expand the toggle links and spring means to actuate the cam, manually operated means carried by the cam and extending through the head for actuating the cam and adapted to contact with the abutment to actuate the head.

7. In a lathe chuck actuating mechanism, a housing, a drive tube, a draw rod connected to the chuck, said housing being supported by the drive tube, means supported by the housing for actuating the draw rod including a head secured to the draw rod, and an abutment extending beyond the head, toggle links interposed between the head and housing, spring means for actuating the head in a longitudinal direction to actuate the draw rod and expand the toggle links, cam means to further expand the toggle links and spring means to actuate the cam, manually operated means carried by the cam and extending through the head for actuating the cam and adapted to contact with the abutment to actuate the head, after the cam is removed from contact with said links.

8. In a lathe chuck actuating mechanism, a drive tube and a housing carried thereby, a draw rod connected to the chuck and extending into the housing, a head carried by the draw rod guided and reciprocable in the housing, toggle links connected between the head and housing, spring means for operating the head in one direction to move the draw rod and expand the toggle links, cam means adapted to operate against the expander toggle links to further expand the same and increase the pressure exerted by the head upon the draw rod.

9. In a lathe chuck actuating mechanism, a drive tube and a housing carried thereby, a draw rod connected to the chuck and extending into the housing, a head carried by the draw rod and reciprocable in the housing, toggle links connected between the head and housing, spring means for operating the head in one direction to move the draw rod and expand the toggle links and cam means adapted to operate against the joint of the expanded toggle links to further expand the same and increase the pressure exerted by the head upon the draw rod, manual means carried by the cam and extending out of the housing to permit the cam to be moved from pressure exerting influence upon the toggle links and adapted to cooperate with the head thereafter to move the draw rod in the opposite direction.

10. In combination with a lathe chuck having a draw rod and a drive tube, a housing supported by the drive tube and supporting a mechanism for operating the draw rod comprising a head secured to the draw rod and reciprocable within the housing, toggle links connecting the head to the housing, an abutment carried by the head and extending beyond the confines of the housing, spring means for moving the head in one direction to move the draw rod longitudinally and to expand the toggle links, means to cooperate with the toggle links to further expand the same and increase the pulling pressure exerted by the head including a cam urged in a longitudinal direction by spring means and having a cam surface adapted to engage the joint of the toggle links, means connected to the cam and extending through the head for moving the cam and head against the pressure of the spring means to collapse the toggle joints and release pressure upon the draw rod.

11. In combination with a lathe chuck having a draw rod and a drive tube, a housing supported by the drive tube and supporting a mechanism for operating the draw rod including a head secured to the draw rod and reciprocable within the housing, toggle links connecting the head to the housing, an abutment carried by the head and extending beyond the confines of the housing, spring means for moving the head in one direction including a helical spring disposed about the draw rod between the head and the housing end wall, and a plurality of springs disposed adjacent the wall of the housing and the periphery of the head between the head and the housing end wall to move the draw rod longitudinally and to expand the toggle links, means to cooperate with the toggle links to further expand the same and increase the pulling pressure exerted by the head including a cam disposed about the draw rod and said first mentioned spring and urged in a longitudinal direction by spring means and having a cam adapted to engage the joint of the toggle links, means connected to the cam and extending through the head for moving the cam against the pressure of the spring means to collapse the toggle joints and release pressure upon the draw rod, and to engage the head to move the same together with the draw rod.

12. In combination with a lathe chuck having draw rod operated jaws and a drive tube, means for actuating the draw rod comprising a housing carried by the drive tube, said draw rod extending into the housing and provided with a head guided by the housing wall and reciprocable therein longitudinally, toggle links connected to the head adjacent the periphery and to the housing, an abutment carried by the head and extending beyond the confines of the housing, spring means for actuating the head in one direction to expand the toggle links and move the draw rod and take up the slack between the chuck jaw and the article being gripped comprising a helical spring disposed about the draw rod between the head and the housing end wall and a plurality of helical springs disposed adjacent the housing wall between the head and housing end wall, means to increase the pressure exerted by the head upon the draw rod to securely clamp the chuck jaw upon the article including a cam disposed about the draw rod and spring and having a cam surface adapted to engage the joint of the partially expanded toggle links to further expand the same, spring means to move the cam disposed about the draw rod and spring between the cam and housing end wall, manually operable means for moving the cam against the spring pressure to permit the toggle links to be collapsed and to move the head and the draw rod including means carried by the cam and extending through the head without the housing and supporting a second head adapted to contact with said abutment to move the first head.

In testimony whereof I hereunto affix my signature this 15th day of November, 1928.

JOHN A. OLSON.